(12) United States Patent
Settimio

(10) Patent No.: US 7,842,105 B2
(45) Date of Patent: Nov. 30, 2010

(54) BALL OF FIRE, AN INVENTION IN THE FIELD OF COMBUSTION

(76) Inventor: Maggiacomo Settimio, Rignano Dr., Itri (LT) c.a.p. 04020 (IT)

( * ) Notice: Subject to any disclaimer, the term of this patent is extended or adjusted under 35 U.S.C. 154(b) by 1363 days.

(21) Appl. No.: 11/078,929

(22) Filed: Mar. 11, 2005

(65) Prior Publication Data

US 2005/0155283 A1    Jul. 21, 2005

Related U.S. Application Data

(60) Provisional application No. 60/553,009, filed on Mar. 15, 2004.

(51) Int. Cl.
*C10L 5/44* (2006.01)
(52) U.S. Cl. .............................. 44/589; 44/551; 44/605
(58) Field of Classification Search .................. 44/605, 44/589
See application file for complete search history.

(56) References Cited

U.S. PATENT DOCUMENTS 4,960,438 A * 10/1990 Benesh et al. .................. 44/589
5,643,342 A *  7/1997 Andrews ....................... 44/530

FOREIGN PATENT DOCUMENTS

DE         10153975 A1 *  5/2003
ES          2012878 A  *  4/1990

* cited by examiner

*Primary Examiner*—Ellen M McAvoy
*Assistant Examiner*—Ming Cheung Po

(57) ABSTRACT

A process of making vegetal fuel based combustible spheres produced from naturally occurring and renewable residues of olive arboricultural farming and olive processing. The combustible spheres providing a renewable energy alternative to the use of fossil fuels. Where the use of the vegetal based combustible spheres replaces fossil fuels, the reduction in the generation of undesirable noxious gasses from combustion is achieved along with reduced consumption of the world's limited fossil fuel reserves.

6 Claims, 2 Drawing Sheets

BALL OF FIRE, AN INVENTION IN THE FIELD OF COMBUSTION

CROSS REFERENCE TO RELATED APPLICATIONS

This application claims priority to co-pending U.S. Provisional Patent Application having Ser. No. 60/553,009 filed Mar. 15, 2004 entitled "Ball of Fire" as submitted by inventor Maggiacomo Settimio of Rigano Dr., Itri (LT) c.a.p. 04020, Italy, having a common applicant herewith, which references Italian Patent Application number LT 03A00000 10 filed Jul. 9, 2003, having a common applicant herewith.

FIELD OF THE DISCLOSURE

The disclosures made herein relate generally to pelletized fuels for combustion having a preformed shape and, more particularly to, pelletized fuels for combustion produced from agricultural residue products, specifically olive husks, applied to replace the use of conventional fossil fuels with the use of renewable natural resource based fuels and thereby reduce the consumption of conventional fuels, ex: wood, coal, oil.

BACKGROUND

The world's demand for energy is growing rapidly, especially now as the developing economies and industrial facilities of major countries such as China and India compete ever more aggressively for the world's limited supply of energy from oil, gas, and other fossil based fuels. Current approaches to reducing the demand for energy include improve the fuel economy of gasoline and diesel powered engines by government regulations and technological development, and implementing energy savings technologies such as improved insulation in homes, automatic set back thermostats, the growing use of wind and solar power as alternative energy sources, etc.

Additionally, it is known that agriculture and farming operations generate by-product waste materials that often are not processed and recovered to serve as alternative fuels or energy sources. This limitation results in additional wasteful consumption of the world's natural resources (forest, coal, oil, etc), and a lost opportunity to recover energy from renewable resources and thereby lessen the demand on fossil fuel reserves.

Another limitation of the use of oil and coal as an energy source is that often it is not formed and packaged in a consistent shape and size that is easily and safely handled. This is especially true when used in applications such as small furnaces, space heaters, etc.

Another limitation of the use of oil and coal is that fossil fuels are known to be in limited supply, and wasteful consumption of these fuels impacts upon and reduces the world's supply of available energy.

Another limitation of conventional fossil fuels is that the combustion of oil and coal is know to produce noxious gasses such as sulpher dioxide and release undesirable heavy metals such as mercury into the atmosphere. These noxious byproducts, as well as many others from fossil fuel combustion, are known to be noxious and dangerous in the environment. The use of arboricultural residues such as olive husks is known to result in a reduction of CO2 and other greenhouse gases, reduction of acid deposition in the soils and waterways, together with a beneficial improvement in income of rural communities by developing new uses for an otherwise low value arboricultural waste material.

Another limitation is that certain fossil fuels are toxic when accidentally released into the environment. Crude oil, for example, is known to kill ocean life and contaminate beaches when a spill occurs. Refined oils as well as crude oils contain various chemical forms of hydrocarbons known to be toxic to animal and plant life when accidentally released into the earth or into a water supply.

Therefore, vegetal based fuel for combustion which could be produced from agricultural waste byproducts such as olive husks, and which provides an alternate energy source and thereby reduces the dependence on and consumption of fossil fuels, and by its use reduces the generation of noxious gasses from combustion, would be useful and novel.

SUMMARY OF THE DISCLOSURE

Embodiments of the inventive disclosures made herein comprise compositions of and forms of a pelletized or formed shape alternative to conventional fuels such as coal, wood, and all the other combustibles either solid, liquid, gaseous, organic, vegetal, fossil, etc. In substance, this invention can replace all those elements that by burning generate heat. Therefore, this invention can be exploited for industrial, commercial, and residential needs, food preparation, and practically in all those situations in which the outcome of a product or process is due to, or is based upon effects generated by combustion.

The aim of this invention is to produce heat by means of combustion of substances absolutely natural, easily findable in nature, not noxious to the natural environment, to the human being, and, furthermore, inexpensive.

By means of the combustion of small quantities of the product at issue, is possible to generate high temperatures for long time. At present, the same result (heat/time) is obtained through use of large quantities of combustibles. The product at issue manages to obtain steady heat intensity with the same initial quantity of product. In fact, a small initial quantity of the product generates almost a "perpetual production of heat" that allows to keep, for many hours, the same heat intensity.

This invention is able to produce heat by means of a mix of low cost products, easy to find in nature, avoiding further damage to the Italian, European and global natural patrimony. In fact, at present, accordingly to official data, the combustible most utilized is wood, and therefore trees.

The invention at issue, manages to generate heats for multiple uses, some examples include:
  Household use—combustion in stoves or fireplaces
  Food cooking—house, restaurants, and barbeque
  Industrial—generation of high temperatures for the fusion of iron and steel.

Small initial amounts of the product manage to maintain steady high performances, at low cost, with considerable savings, and, most of all, in the full respect of the nature (the product will allow the reformation of the forest patrimony) and will keep a safe natural environment (the product, in fact, does not leave combustion discharges since its combustion does not generate noxious element in the air.

At present, all the combustibles (wood, coal, gas, petroleum, etc.) are either very expensive, noxious, or very rare.

The product "Ball of Fire" is a very low cost product since its basic element (the olive husk) is buyable at a very low price, being an olive processing residual. This element is not noxious since its combustion does not free any noxious element neither for the natural environment nor for the human health. Furthermore, it is a product that does not risk extinction; actually its usage on a large scale will increment the forest patrimony, with beneficial effects on either the human beings (better air, better breathing) and for the natural environment (avoiding of natural disasters like landscapes, avalanches, etc.).

It is an objective of the inventive disclosures made herein to provide an alternative fuel to the use of conventional forest and fossil fuels, and thereby reduce the consumption of the world's limited reserves of forest wood and fossil fuels.

It is another objective of the inventive disclosures made herein to provide an beneficial use for agricultural waste byproducts such as olive husks, and thereby improve the economic life of rural communities while providing an alternative energy source.

It is another objective of the inventive disclosures made herein to provide an alternative fuel source from renewable and natural sources, and one that does not deplete the ecology of the planet over time.

It is another objective of the inventive disclosures made herein to provide an alternative vegetal based energy source for use as a fuel in combustion which reduces the emission of noxious gasses such as sulpher dioxide and release undesirable heavy metals such as mercury into the atmosphere. These noxious byproducts, as well as many others from fossil fuel combustion, are known to be noxious and dangerous in the environment, as well as producing acid rain and the environmental damage that results.

It is another objective of the inventive disclosures made herein to provide an alternate energy source to the use of environmentally toxic fossil fuels. It is known that certain fossil fuels are toxic when accidentally released into the environment. Crude oil, for example, is known to kill ocean life and contaminate beaches when a spill occurs. Refined oils as well as crude oils contain various chemical forms of hydrocarbons known to be toxic to animal and plant life when accidentally released into the earth or into a water supply.

These and other objects of the invention made herein will become readily apparent upon further review of the following specification and associated drawings.

BRIEF DESCRIPTION OF THE DRAWINGS

The drawings show a form of the invention that is presently preferred, however the invention is not limited to the precise arrangement shown in the drawings.

DETAILED DESCRIPTION OF THE DRAWINGS AND COMPOSITION

Figure 1:
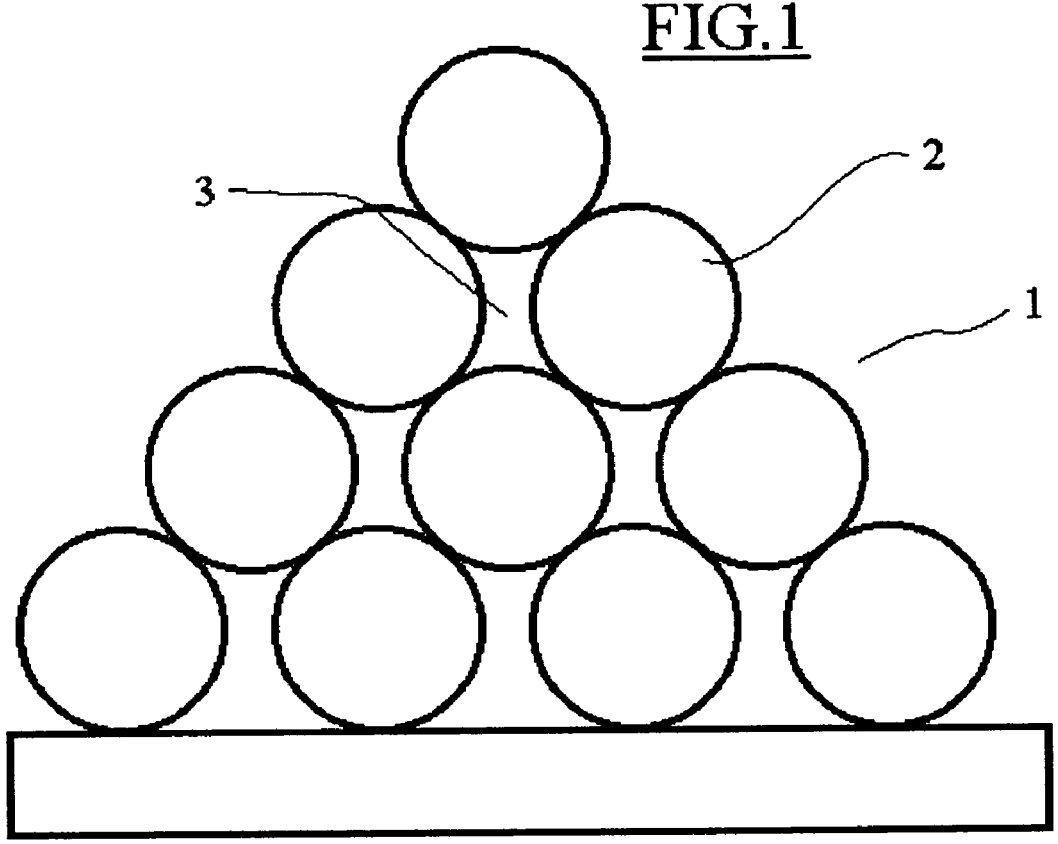
FIG. 1 is a side view of one possible embodiment of a pyramid of combustible "Ball of fire" spheres, as described in the subject provisional application disclosure. The invention is not limited to the arrangement, general shape (spherical as shown), size, or number of spheres.
Figure 2:
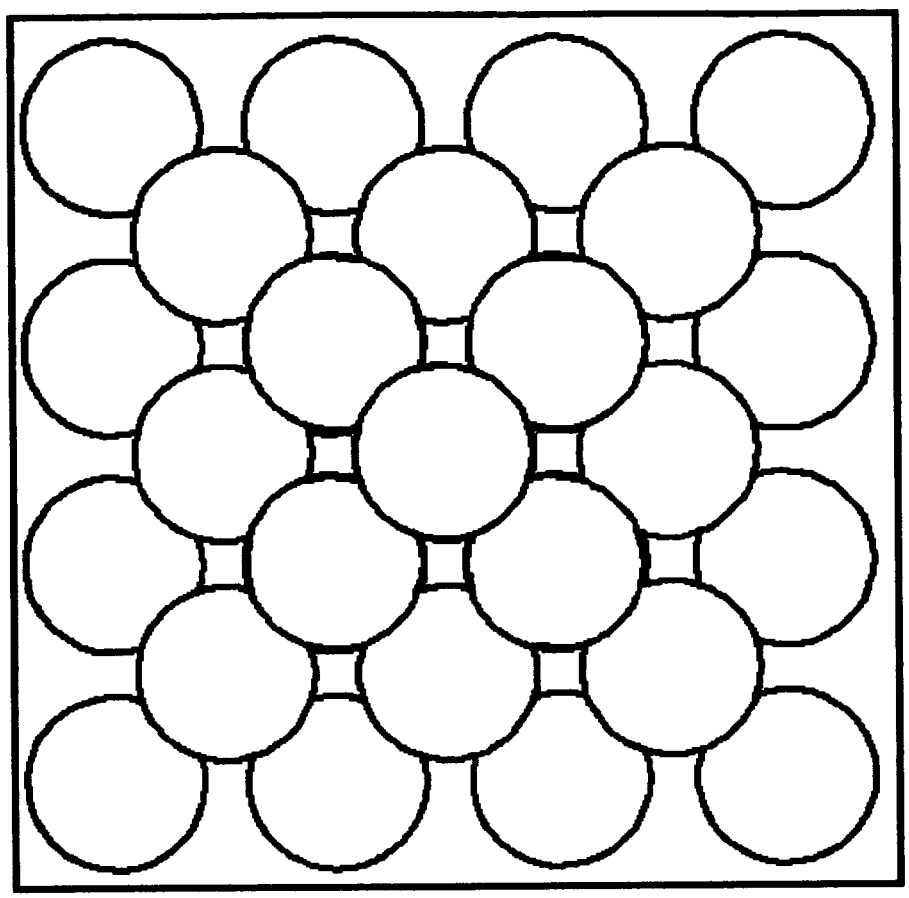
FIG. 2 is a top or plan view of one possible embodiment of the combustible "Ball of fire" spheres, as described in the subject provisional application disclosure. The invention is not limited to the arrangement, general shape (spherical as shown), size, or number of spheres.

FIG. 1 and FIG. 2 depicts an embodiment of the present invention, a plurality of vegetal based combustible fuel spheres produced from olive husks and various binding agents as presented in this inventive disclosure. The vegetal based combustible spheres 2 are stacked in layers It is preferred that the combustible spheres be placed into a pyramid stack to concentrate the heat and allow airflow for combustion. A method of arranging vegetal based uniformly shaped combustible spheres into a pyramid to concentrate heat for efficient combustion is presented in FIG. 1 and FIG. 2. The method comprises positioning the first row of combustible spheres 2 on a base in a generally rectangular grid pattern such that spacing between adjacent spheres is less than diameter of the sphere. Subsequent layers or rows are then added such that each sphere of the next row rests on a side of 4 spheres in the row below. By following this progression a pyramid stack 1 is formed. Arranging the spheres in this manner provides spaces between the spheres allow oxygen to reach the spheres in the pyramid in support of combustion.

For a better use of this invention, and in respect of the natural rules that allow combustion, the combustible spheres should be positioned one on top of the other, creating a pyramid of spheres. The reason for advising the pyramidal set is that, in such a manner, the spherical shape of the balls creates empty spaces, which provides room for oxygen, thereby allows the fire to expand faster.

The vegetal, or partially vegetal solid combustible at issue, named "Ball of Fire", has, as its basic element, the "olive husk" (residual generated from the milling grinding of olive after oil extraction). To the aim of shaping it and give it a certain consistence, as well as keeping it compact, either before and after the combustion, some other elements are mixed to it: water, flour "00" type, concrete or glue. Utilizing only water and flour "00" type, or exclusively water, we generate an absolutely vegetal product; mixing it with water, concrete or glue we have a semi vegetal or chemical combustible.

In any instance, we deal with products very common in nature, inexpensive, and not noxious (it also would avoid the selling off of the olive husk). Three are the formulas of the product at issue. The proportions of components presented below are preferred, however it is to be understood that the invention is not limited to the precise proportions identified in formulas 1 through 3 below. For example, in formula 1 olive husk may for discussion be present in a range of 45% to 75% and achieve the invention, although not the preferred embodiment of the invention. Similar ranges apply to components in formulas 1 through 3.

The common basic component to all the formulas is the "olive husk" that, properly mixed with other elements, that function substantially as a glue, allows obtainment of the product at issue.

Let's start explaining how to mix such products and the respective proportions in the mixing.

Formula #1
Olive husk: 55.5%
Water: 36.2%
Flower "00" type: 8.3%

In these proportions, all the elements are mixed until obtainment of a homogenous mixture.

In a second production phase, such a mixture is shaped. It can be shaped in different ways accordingly to the use to which it is destined. In one embodiment disclosed herein, it is presented in a spherical shape.

Depending on the intended use of the product, the mixture, can be produced in various weights and sizes (50, 100, 200, 300 grams), depending on whether is has to be utilized for house stoves, fireplaces, barbeque, or industrial ovens of big dimensions.

Once amalgamated, the product needs to pass the drying phase, which can be natural of artificial. The natural drying can occur just leaving the product to natural air in open spaces.

For a better use of this invention, and in respect of the natural rules that allow combustion, our balls of fire should be positioned one on top of the other, creating a pyramid of spheres. The reason for advising the pyramidal set is that, in such a manner, the spherical shape of the balls creates empty spaces, which provides room for oxygen, thereby allows the fire to expand faster.

Formula #2
Olive husk: 55.5%
Water: 36.2%
Concrete: 8.3%

The working process to obtain the end product is the same of that stated for Formula 1.

Formula 3
Olive husk: 59.8%
Water: 38.922%
Vinyl glue: 1.198%

The working process to obtain the end product is the same of that stated for Formula 1.

In the preceding detailed description, reference has been made to the accompanying drawings that form a part hereof, and to formulations to disclose by way of illustration specific embodiments in which the invention may be practiced. These embodiments and certain variants thereof, have been described in sufficient detail to enable those skilled in the art to practice the invention. It is to be understood that other suitable embodiments may be utilizes for example modifications in shape size, or modifications to specific formulation percentages, or additions of other binding agents known to those skilled in the art without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A process of making vegetal fuel based combustible spheres, comprising:
   providing a binding agent including concrete;
   mixing olive husk, water and said binding agent to produce a homogeneous mixture;
   forming the mixture into a number of combustible spheres, said spherical shape providing air space between adjacent spheres even when said spheres are placed side by side; and
   drying the spheres to remove water;
   wherein said binding agent is operative to maintain said spherical shape of said spheres during combustion.

2. The process of claim 1 wherein the binding agent further comprises flour type "00".

3. The process of claim 2 wherein the mixture has the olive husk in an amount of at least 45% and not exceeding 70% by volume; and the binding agent is in an amount of at least 3% and not exceeding 15% by volume.

4. The process of claim 2 wherein the mixture has olive husk in an amount of 55.5% by volume; binding agent in an amount of 8.3% by volume; and water in an amount of 36.2% by volume.

5. The process of claim 1, wherein
   the forming step further includes sizing and adapting the combustible spheres to permit said spheres to be positioned into a generally rectangular grid pattern such that spacing between adjacent spheres is less than diameter of the sphere and spheres added in a next row of spheres rest on a side of 4 spheres in the row below.

6. A vegetal based spherical combustible fuel pellet produced according to the process of claim 5.

* * * * *